Aug. 6, 1968 M. ACKERMAN 3,395,963

OPTOELECTRIC DATA READOUT DEVICE

Filed Nov. 15, 1965 2 Sheets-Sheet 1

INVENTOR
MARVIN ACKERMAN

BY A. C. Smith
ATTORNEY

INVENTOR
MARVIN ACKERMAN
BY A. C. Smith
ATTORNEY

United States Patent Office 3,395,963
Patented Aug. 6, 1968

3,395,963
OPTOELECTRIC DATA READOUT DEVICE

Marvin Ackerman, Sunnyvale, Calif., assignor to Hewlett-Packard Company, Palo Alto, Calif., a corporation of California Filed Nov. 15, 1965, Ser. No. 507,869
10 Claims. (Cl. 250—219)

This invention relates to data card readout devices and has as its object the provision of an improved optoelectric readout device.

This object is accomplished in accordance with the illustrated embodiment of this invention by providing a narrow interface between a light control prism and a surrounding medium of dissimilar optical characteristics. The prism is adapted to uniformly transmit light to this narrow interface at more than a critical angle with respect to a perpendicular to the interface so that a substantial portion of the incident light is reflected to the surface of a data card which is driven along the base of the prism. Some of the light striking the surface of the data card, which is provided with a varying reflectance indicative of the desired data, is diffused and reflected back to the prism. The prism is further adapted to transmit a portion of this light to the narrow interface at less than the critical angle. Light striking the narrow interface at less than the critical angle is transmittted therethrough and monitored by a light-sensitive detector. The light-sensitive detector is responsive to the varying quanta of light transmitted through the narrow interface in accordance with the varying reflectance of the data card, for producing an electrical signal indicative of the desired data.

Other and incidental objects of this invention will become apparent from a reading of this specification and an inspection of the accompanying drawing in which.

Figure 1:
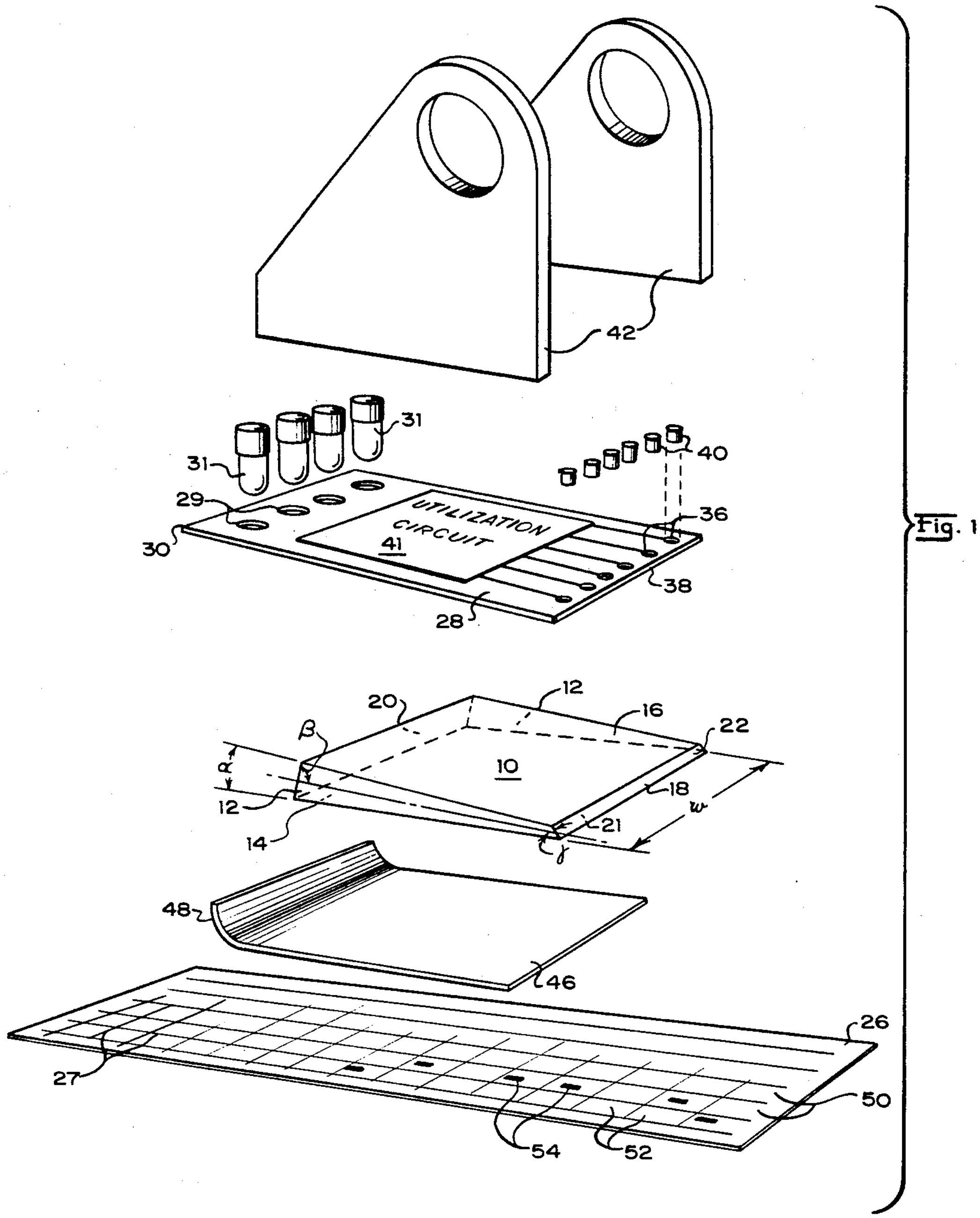
FIGURE 1 is an exploded and perspective view of an optoelectric readout device in accordance with this invention.
Figure 2:
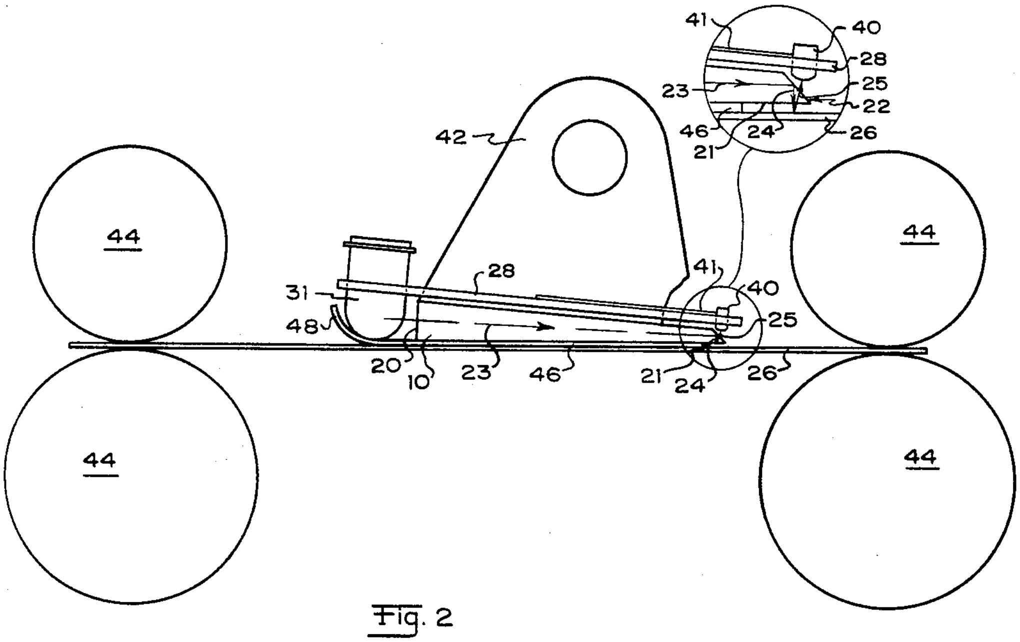
FIGURE 2 is a side view of the optoelectric readout device of FIGURE 1 when assembled and mounted for reading out a data card which is engaged by a card drive.

Referring now to FIGURES 1 and 2, there is shown a light control prism 10 which, for example, may be molded from a body of acrylic resin. For purposes of this specification and the claims appended thereto, a prism is herein defined as any radiation transmissive body bounded in part by two faces which are not parallel. The prism 10 is formed with parallel sides 12 and with a base 14 and top 16 lying in planes which interesect one another at an angle $\alpha$ and which normally intersect the parallel sides 12. Although the base 14 and top 16 may be parallel, they are best formed at the angle $\alpha$ to strengthen the prism 10 which is provided with a narrow front end 18. By maintaining the angle $\alpha$ less than 6°, the prism 10 may be strengthened without greatly increasing the amount of back ambient light leaving the prism 10. The back end 20 of the prism 10 is formed at an angle $\beta$ of about 90° with respect to a plane bisecting the prism between the base 14 and the top 16, and the narrow front end 18 is formed at an angle $\gamma$ of about 45° with respect to this bisecting plane. The width $w$ of the prism 10 may be selected in accordance with the desired number of readout channels, but typically corresponds to the width of conventional data cards. To minimize the amount of light leaving the prism 10 by other than the desired optical path and the amount of ambient light entering the prism, the top 16 and the base 14, except for a narrow strip 21 of the base 14 adjacent to the front end 18, may be painted with a flat black paint. The sides 12 may be painted with flat white paint to make them reflective to inicident light from within the prism 10.

A narrow interface 22 is formed between the front end 18 of the prism 10 and the surrounding medium, for example air, of dissimilar optical properties. As is well known to those versed in the optical art, a critical angle of incidence with respect to a perpendicular to the interface 22 exists at which a ray of light traveling through the prism 10 and striking the interface 22 will be reflected rather than transmitted. With the prism formed as described above, most of the light entering the back end 20 is transmitted along a first optical path, as indicated by the line 23, to the narrow interface 22 at more than this critical angle. Therefore, this incident light is largely reflected from the narrow interface 22 along a second optical path, as indicated by the line 24, to the narrow strip 21 of the base 14. This reflected light strikes the narrow strip 21 at less than the critical angle and therefore leaves the base 14. If the light leaving the base 14 strikes a surface causing diffuse reflection of incident light, such as the surface of a data card 26, some of the light is reflected back through the narrow strip 21 of the base 14 along a third optical path, as indicated by the line 25, to the narrow interface 22 at less than the critical angle so that a narrow band of light is transmitted through the interface 22. The prism 10 may be formed so that the width of this narrow band of light at the interface 22 is of the order of 40 mils or less. This is done by forming a curved junction between the top 16 and the front end 18 of the prism 10, by careful selection of the angle $\gamma$, and by making the front end 18 as narrow as possible without making it too fragile. With such a narrow band of light, it is possible to place the data card information columns 27 closer together than would otherwise be possible and thus read more information from a single data card 26.

A mounting plate 28 is attached to the top 16 of the prism 10, but is spaced a small distance therefrom to allow for the presence of component leads and conductors on the underside of the mounting plate. This mounting plate 28 overhangs both ends of the prism 10. A plurality of mounting holes 29 are uniformly spaced adjacent to the back end 30 of the mounting plate 28 for receiving a like plurality of light sources 31. These light sources 31 are connected to a source of power and are mounted adjacent to the back end 20 of the prism 10 so as to uniformly illuminate the back end 20.

Figure 3:
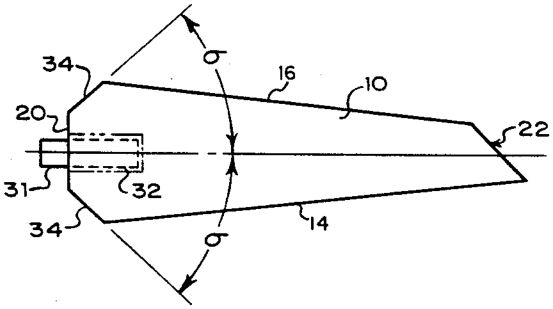
FIGURE 3 is a side view of another light control prism which might be used in the readout device of FIGURE 1.

According to another embodiment of this invention, the light sources 31 are mounted in cavities formed near the back end 20 of the prism 10. The prism 10 is then shaped and painted with flat white paint where appropriate to direct the light uniformly toward the interface 22. For example, as indicated in FIGURE 3, a plurality of cavities 32 may be formed in the back end 20 of the prism 10 and the light sources 31 mounted therein. The back edges 34 of the prism 10 are then formed to make an angle $\sigma$ of about 42° with the bisecting plane passing between the base 14 and top 16 of the prism. These beveled back edges 34 are painted with a reflective flat white paint so that light from light sources 31 is uniformly directed to the interface 22.

Referring again to FIGURES 1 and 2, a plurality of holes 36 corresponding in number to the desired number of readout channels, is also uniformly spaced adjacent to the front end 38 of the mounting plate 28 for receiving a like number of photodiodes 40. These photodiodes 40 are connected to a utilization circuit 41 and are mounted adjacent to the interface 22 so as to monitor the narrow band of light transmitted through the interface 22 and apply a corresponding electrical signal to the utilization circuit 41. The photodiodes 40 are positioned very close to the interface 22 which in turn is positioned very close to the data card 26 so that the distance light must travel from the data card 26 along the third optical path, as indicated by the line 25, to the photodiodes 40 is minimized. This facilitates more efficient use of the light striking the data card 26 for reading out information from the data card.

A pair of brackets 42 are attached to the sides 12 of the prism 10 for mounting the prism in contact with the surface of the data card 26 as the data card is driven in the forward direction by a card drive, which is indicated in FIGURE 2 by the rotary gears 44. The base 14 of the prism 10 may be protected against excessive wear by covering all of it, except the narrow strip 21 adjacent to the front end 18, with a wear resistant plate 46. The back edge 48 of this plate 46 extends beyond the back end 20 of the prism 10 and is curved to facilitate smooth engagement with the data card 26. As is typically the case, the data card 26 has information recorded thereon in a plurality of parallel channels 50. For each channel 50, this information is recorded by varying the reflectance of selected columns 27 of the data card 26. Thus, for each channel 50, the surface of the data card 26 is characterized by white reflective portions 52 and dark nonreflective portions 54.

Figure 4:
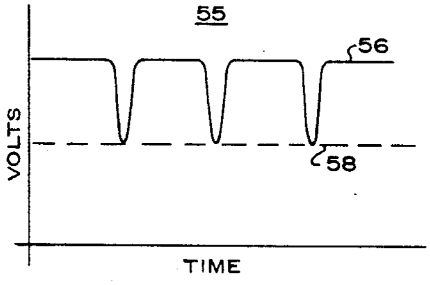
FIGURE 4 is a plot of the electrical signal produced by a single channel of the light sensitive detector of FIGURE 1.

In operation, as the data card 26 is driven past the narrow strip 21 of the base 14 it is illuminated by light which is transmitted along the first optical path, as indicated by the line 23, and reflected from the interface 22 along the second optical path, as indictaed by the line 24, down through the narrow strip 21 of the base. The quantum of incident light which is diffused and reflected from the surface of the data card 26 back along the third optical path to the interface 22 at less than the critical angle varies for each channel 50 in accordance with the varying reflectance of that portion of the data card 26. Each photodiode 40 is therefore responsive to the varying reflectance of one channel 50 of the data card 26 for applying an electrical signal 55, which correspondingly varies in amplitude, to the utilization circuit 41. As shown in FIGURE 4, this electrical signal 55 varies in voltage between a white level 56, corresponding to the white reflective portions 52 of one channel 50 of the data card 26, and a dark level 58, corresponding to the dark nonreflective portions 54 of the same channel 50 of data card 26. It is important to note that the voltage difference between the white level 56 and the dark level 58, is substantially increased with the improved optoelectric readout device of this invention as compared to the voltage difference obtained with many conventional optoelectric readout devices.

I claim:

1. An optoelectric readout device having at least one channel for reading out information from an information carrying element having a reflectance indicative of the information to be read out, said device comprising:

a source of radiation;

a radiation control prism including first, second and third optical paths and one surface forming an interface with an adjacent medium of dissimilar optical characteristics, said prism being positioned for receiving radiation from said source and transmitting it along said first optical path to said interface at more than the critical angle for said interface so that it is largely reflected along said second optical path to an information carrying element having a reflectance indicative of the information to be read out and from which some of the incident radiation is reflected along said third optical path back to said interface at less than the critical angle so that it is transmitted therethrough;

a radiation-sensitive detector for each channel of said device, said detector being poistioned adjacent to said interface for monitoring the radiation transmitted therethrough and producing an electrical signal indiactive of the reflectance of the information carrying element.

2. An optoelectric readout device as in claim 1 wherein said radiation is light.

3. An optoelectric readout device as in claim 2 wherein:

said prism includes a base and a top each communicating with said one surface; and said interface is a narrow interface disposed at an angle with respect to said base and said top for receiving light transmitted along said first optical path at more than the critical angle so that it is reflected along said second optical path and through said base to the the information carrying element, and for receiving light transmitted back along said third optical path at less than the critical angle so that it is transmitted through said interface to the adjacent medium.

4. An optoelectric readout device as in claim 3 wherein:

said base and said top are disposed at a small angle with respect to one another; and said interface is disposed at an angle of about forty-five degrees with respect to a plane bisecting said prism between said base and said top.

5. An optoelectric readout device as in claim 4 wherein said device includes a utilization circuit connected to said detector for utilizing the electrical signal produced by said detector.

6. An optoelectric readout device as in claim 5 wherein said device includes:

supporting means attached to said prism for supporting said prism so that said base is positioned adjacent to the information carrying element which is engaged by drive means for being driven in a forward direction along said base; and a wear resistant layer fixed to said base for protecting said base from excessive wear, said layer covering all of said base but a narrow strip adjacent to said interface.

7. An optoelectric readout device as in claim 6 wherein portions of said prism are covered with one of reflective and non-reflective paint to improve the efficiency of said device.

8. An optoelectric device as in claim 3 wherein:

said prism includes another surface communicating with said base and said top opposite said one surface; and said source is mounted adjacent to said other surface.

9. An optoelectric readout device as in claim 8 wherein said device includes mounting means connected to said prism for mounting said source adjacent to said other surface and for mounting said detector adjacent to said one surface.

10. An optoelectric device as in claim 3 wherein:

said prism includes at least one cavity therein for receiving said light source; and said light source is mounted in said cavity.

References Cited

UNITED STATES PATENTS

| | | | |
|---|---|---|---|
| 3,248,554 | 4/1966 | Chen | 250—227 |
| 3,299,770 | 1/1967 | Witt et al. | 250—227 X |
| 3,320,429 | 5/1967 | McGregor | 250—219 |

WALTER STOLWEIN, *Primary Examiner.*